United States Patent Office 3,845,119
Patented Oct. 29, 1974

3,845,119
ORGANICS FROM TRONA BRINE BY CO₂ TREATMENT
Roy B. Duke and Ned F. Seppi, Littleton, Colo., assignors to Marathon Oil Company, Findlay, Ohio
No Drawing. Filed Nov. 10, 1972, Ser. No. 306,477
Int. Cl. C07c 51/42, 51/48
U.S. Cl. 260—527 R                11 Claims

ABSTRACT OF THE DISCLOSURE

Black trona brine is charged to an autoclave, reacted with carbon dioxide under pressure to precipitate some of the organic matter, and then filtered or centrifuged, preferably under carbon dioxide pressure to recover a mixture of polymeric carboxylic acids. In addition, the filtrate is further processed to recover a mixture of $C_4$–$C_{14}$ linear dicarboxylic acids and other carboxylic acids.

BACKGROUND OF THE INVENTION

Field of the invention

The present invention relates to the field of chemical purification of mineral substances generally classified in United States Patent Office Class 23/209.2 (carbon products).

Description of the prior art

Various references have produced dicarboxylic acids and esters by treatment with carbon monoxide or carbon dioxide, e.g. U.S. 2,801,263; U.S. 3,439,026; U.S. 2,816,917; U.S. 2,837,566; U.S. 3,433,830; U.S. 3,41,578; U.S. 2,687,432; U.S. 2,710,878; U.S. 2,710,879; U.S. 2,816,916.

The presence of organic materials in oil-shale kerogen and black trona brine in the Green River formation is discussed in Kohl, Geochemistry, vol. II, pages 22–31 by J. I. Fester and W. E. Robinson. Mineral acids have been utilized to separate the organic and inorganic matter from oil-shale; they have also been employed to precipitate the organic matter from the black trona brines (see U.S. Department of Interior, Bureau of Mines Report of Investigations 4943 (January 1953). In addition, carbonic acid has been utilized to treat oil shale, to separate the dolomite and calcite, thereby concentrating the organic matter. (See vol. XLVIII, Fuel, January 1969, pp. 75–80). None of the above references, however, teach the ability to recover linear dibasic acids and polymeric carboxylic acids from naturally-occurring black trona brine by treatment with carbon dioxide according to the present invention.

SUMMARY OF THE INVENTION

General statement of the invention

In the Eden Valley, Wyo., at depths of about 500 feet, a naturally-occurring flow of black artesian water is found. This water, referred to as black trona, has a pH of about 10 and when acidified, yields a voluminous organic precipitate and carbon dioxide. Analysis of the black trona brine has indicated that it contains as much as 11% organic matter and up to 5% sodium carbonate and bicarbonate. The base-soluble organic matter is reported to have an average molecular weight of about 1500 and a neutralization equivalent of about 500. The present invention involves the discovery that the valuable organic materials in black trona brine can be efficiently and economically recovered by a process involving the following combination of steps:

(a) reaction of the brine with carbon dioxide to effect precipitation of the bulk of the organic matter, (b) filtration or centrifugation of the reaction mixture to separate a mixture of polymeric carboxylic acids, (c) processing the filtrate to recover among other things, a mixture of $C_4$–$C_{14}$ linear dicarboxylic acids.

Each of these steps is discussed in more detail below.

Precipitation with carbon dioxide

The present invention embodies the discovery that the organic matter, which constitutes up to 11% or more of the black trona brine, consists primarily of sodium salts of carboxylic acids which, when treated with carbon dioxide, enter into the following reactions:

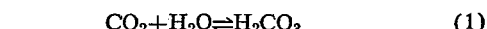
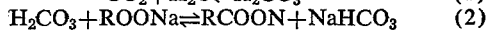
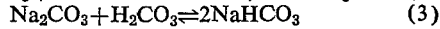

$$CO_2 + H_2O \rightleftharpoons H_2CO_3 \qquad (1)$$
$$H_2CO_3 + ROONa \rightleftharpoons RCOON + NaHCO_3 \qquad (2)$$
$$Na_2CO_3 + H_2CO_3 \rightleftharpoons 2NaHCO_3 \qquad (3)$$

The polymeric nature, i.e., high molecular weight of the bulk of the organic matter in the black trona brine, caused it to precipitate when the carboxylic acid salts are converted to the free acids by reaction with carbonic acid according to reaction (2).

The sodium carbonate in the reaction mixture reacts according to equation (3) to give sodium bicarbonate.

In order to drive the equilibrium shown in reaction (2) to the right, the trona acids are treated with carbon dioxide under pressure. The pressure range during treatment with carbon dioxide is not narrowly critical but will be preferably in the range of from about 20 to about 2000 pounds per square inch gage, more preferably from about 50 to about 1500 p.s.i.g. and most preferably from about 100 to about 950 p.s.i.g. The usual techniques for developing optimum gas-liquid contact can be utilized with the carbon dioxide, e.g., spargers, high-energy stirrers, and the like. Alternatively, the carbon dioxide can be introduced in the solid form should this be more desirable under the particular circumstances.

Treatment of precipitate

*Separation of Polymeric Carboxylic Acids.*—After carbon dioxide treatment (or during it where the carbon dioxide treatment occurs in a vessel having a side loop containing the filter through which the reaction mixture is continuously circulated), the product mixture is filtered or centrifuged to remove the insoluble carboxylic acids. This filtration or centrifugation is preferably carried out under carbon dioxide pressure to keep reactions (2) and (3) from reversing, thereby removing the sodium bicarbonate with the filtrate. Alternatively, it has been discovered that it is not necessary to carry out the filtration (or centrifugation) under carbon dioxide pressure because the precipitate formed under carbon dioxide pressure has sufficiently long life to allow the separation to be effected at atmospheric pressure. It is still desirable, however, to maintain a carbon dioxide atmosphere at this point. The reason for this slow reversal of reaction (2) is probably due to the insolubility of the bulk of the organic matter in the aqueous phase which contains sodium bicarbonate. The insoluble nature of the major portion of the organic matter thus prevents it from intimately mixing with the basic solution to reconvert the acids back to their water-soluble form. Translating the latter discovery into tangible processing advantages, it is evident that it eliminates the necessity for pressurized filters or centrifuges which are more difficult to operate and more expensive to construct; however, where desired, the filtration or centrifugation can, of course, be accomplished under carbon dioxide pressure.

Filtration on centrifugation equipment will generally be conventional in nature. Where filters are employed, a porosity of from about 0.5 to about 500 microns, more preferably from about 1 to about 100, and most preferably from about 5 to about 50 microns, will generally be utilized.

The ratio of carbon dioxide to black trona brine is determined by the volume of brine and the carbon dioxide pressure. In order to shift reaction (2) to the right, an excess of carbon dioxide is desirable. In general, the solution is maintained under the desired carbon dioxide pressure until the solution is saturated.

It has also been found to be advantageous to heat the precipitate to 100° C. or more under carbon dioxide pressure. This causes the precipitate to coagulate, making filtration or centrifugation more rapid.

*Products.*—The polymeric carboxylic acids isolated by treatment of the brine with carbon dioxide contain about 20% ether-soluble carboxylic acids. The remaining 80% is a polymeric substance which is insoluble in most common solvents. After isolation, the entire organic precipitate may be pyrolyzed to a mixture of lower molecular weight hydrocarbons, useful as synthetic crude oil. The synthetic crude oil can then be refined by conventional techniques. Alternatively, the mixture may be extracted to separate the lower molecular weight material. The higher molecular weight materials can then be pyrolyzed to produce such synthetic crude oil. The lower molecular weight material may be converted to the corresponding sodium or potassium salt to make useful surface-active agents.

Recovery of carboxylic acids from the filtrate

*Mineral acid—extraction technique.*—The filtrate from the above-described filtration or centrifugation step can be acidified to a pH of 2 or less with mineral acids, e.g. sulfuric acid, and then extracted with organic solvent, e.g., ether, ethyl acetate, or n-butanol, to obtain the remaining organic matter. The amount of mineral acid necessary to reach a pH of 2 or less, varies, depending upon the source of the black trona brine, because the amount of organic matter as well as the amounts of sodium carbonate and bicarbonate in the brine vary from location to location.

*Carbon dioxide—extraction technique.*—Another method of recovering the water-soluble, linear dicarboxylic acids from the filtrate consists of returning the filtrate to the autoclave along with diethyl ether or some other water immiscible organic solvent in which the lower molecular weight carboxylic acids are soluble, pressuring with carbon dioxide, and with good agitation, allowing the carboxylic acids to be extracted into the organic solvent. This process can be repeated or carried out continuously until the carboxylic acids are quantitatively removed. Carbon dioxide pressures ranging from 25 to 950 p.s.i.g. are advantageous during extraction. Evaporation of the organic solvent yields the carboxylic acid, including the $C_4$-$C_{14}$ linear dicarboxylic acids.

*Ion-exchange extraction technique.*—In lieu of the acid treatments described above, the filtrate can be passed through an ion exchange column to exchange the soluble cations for hydrogen. The main reactions occurring in this column are as follows:

$$\text{Resin}-\text{H}+\text{NaHCO}_3 \rightleftharpoons \text{Resin}-\text{Na}+\text{CO}_2+\text{H}_2\text{O} \quad (4)$$

$$\text{Resin}-\text{H}+\text{RCOONa} \rightleftharpoons \text{Resin}-\text{Na}+\text{RCOOH} \quad (5)$$

The dicarboxylic carboxylic acids, due to their low concentration and solubility in water, elute from the column. The mixture of dicarboxylic acids may be recovered from the eluate at this point by solvent extraction.

*Ion exchange—ion exchange technique.*—As a modification of the above-mentioned procedure, the filtrate, after first being reacted with the cation exchange resin is then reacted with an anion exchange resin. The principal reactions occurring on this resin are shown in equation (6):

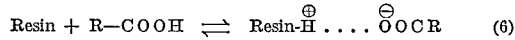

The chemisorbed acids may be eluted from this column by known techniques to effect a partial separation of the various dicarboxylic acid isomers.

*Regeneration of cation exchange column.*—The cation exchange column is spent when it ceases to exchange hydrogen for the metallic cation (Equations 4 and 5). To return it to its hydrogen form, water is passed through the column under carbon dioxide pressure. The carbonic acid formed in situ converts the resin to its hydrogen form, liberating sodium bicarbonate.

After regenerationis complete, the sodium bicarbonate can be recovered by evaporation of the water. Alternatively, the cation exchange resin may be regenerated with a mineral acid forming the sodium salt of the mineral acid anion.

*Regeneration of anion exchange column.*—The carboxylic acids may be eluted from the anion exchange resin with a solution of constantly changing pH, thereby effecting a separation of the acids according to their relative, $pK_a$ values.

The carboxylic acids isolated in this manner can then be further purified, e.g., by recrystallization, sublimation, or distillation.

EXAMPLES

The feasibility of precipitation of the trona acids with carbon dioxide can be demonstrated using a Millipore pressure filter, which can be operated at 300–400 p.s.i.g. The experiments described in the following examples employed an 8µ Millipore filter.

EXAMPLE I

In the first experiment, the brine is simply pressured with 300–400 pounds of carbon dioxide in the Millipore filter, allowing filtration to begin immediately. No attempt is made to mix the carbon dioxide and brine prior to filtration. This procedure yields only about 1% organic precipitate, as compared with 10–11% that may be isolated by sulfuric acid precipitation.

EXAMPLE II

In the second Millipore filter experiment, the same brine used in Example I is shaken after pressuring with carbon dioxide. This experiment yields 4.7% organic matter and shows that mixing is vital to increasing the yield of precipitate.

EXAMPLE III

In a final experiment, the brine is placed in the filtration vessel and the latter inverted so that the brine cannot pass through the filter before reaction with the carbon dioxide is complete. The filter is then pressured to 300–400 p.s.i.g. with carbon dioxide and shaken intermittently for about 30 minutes. The vessel is then inverted, allowing filtration to begin. This experiment yields 10.1% organic matter. The filtrate from this experiment is placed in the pressure filter again and the same procedure repeated. The amount of precipitate obtained upon subsequent reaction with carbon dioxide is negligible, indicating that the reaction time and filter porosity are adequate for the desired separation.

EXAMPLE IV

The filtrate from Example III is acidified to a pH of 1 with sulfuric acid and extracted with ether. After separation of the ether, the aqueous phase is adjusted to a pH of 3 and extracted with n-butanol. The ether and butanol extractions give 0.8% and 0.2% organic matter, respectively. The organic matter recovered by carbon dioxide precipitation and extraction total 11.1%, which compares quite favorably to the totals that can be obtained by direct sulfuric acid treatment.

EXAMPLE V

The ether extract of the acidified filtrate is analyzed by gas-liquid chromatography and shown to contain 0.34% (based on original brine) of a mixture of $C_4$–$C_{14}$ linear dicarboxylic acids.

Modifications of the Invention

It will be understood that a variety of modifications and variations of the invention will be apparent to those skilled in the art upon a reading of the present specification and that all such modifications and variations are intended to be included within the spirit of the claims appended hereto.

What is claimed is:

1. A process for the recovery of carboxylic acids from black trona brine, comprising the steps of:
    (a) reaction of the brine with carbon dioxide to effect precipitation of the bulk of the organic matter,
    (b) filtration or centrifugation of the reaction mixture to separate a mixture of insoluble polymeric carboxylic acids from a filtrate containing a mixture of $C_4$–$C_{14}$ dicarboxylic acids or sodium salts thereof
    (c) recovering a mixture of $C_4$–$C_{14}$ dicarboxylic acids from the filtrate.

2. The process of claim 1 for the recovery of carboxylic acids from black trona brine, wherein sodium salts within said filtrate are converted to the corresponding free carboxylic acids by contact with a cationic ion exchange resin in its hydrogen form or a mineral acid and a mixture of $C_4$–$C_{14}$ linear dicarboxylic acids is recovered from the filtrate.

3. The process according to claim 2 wherein the carbon dioxide formed during treatment of said filtrate with said cationic exchange resin or mineral acid is recycled back to step (a) of claim 1 for contact with said black trona brine.

4. The process of claim 1 for the recovery of carboxylic acids from black trona brine, wherein said sodium acid salts within said filtrate are converted to the corresponding carboxylic acids by reaction with carbon dioxide and a mixture of $C_4$–$C_{14}$ linear dicarboxylic acids is recovered from the filtrate.

5. The process according to claim 1 wherein the organic precipitate is separated from the filtrate while it remains under $CO_2$ pressure.

6. A process according to claim 1 wherein the organic precipitate is separated from the filtrate after removal of the $CO_2$ pressure.

7. The process according to claim 1 wherein said filtrate is extracted with a water-immiscible organic solvent under $CO_2$ pressures ranging from 25 to 950 p.s.i.g., and wherein said organic solvent for said extraction is selected from the group consisting of diethyl ether, ethyl acetate, and benzene.

8. The process according to claim 7 wherein the extraction solvent is diethyl ether.

9. The process according to claim 7 wherein the extraction solvent is ethyl acetate.

10. The process according to claim 7 wherein the extraction solvent is benzene.

11. The process of claim 7 wherein sodium carbonate and sodium bicarbonate are recovered by evaporation of water from the filtrate after extraction.

References Cited

U.S. Dept. of Interior, Bureau of Mines Report of Investigations 4943, January 1953.

VIVIAN GARNER, Primary Examiner

UNITED STATES PATENT OFFICE
CERTIFICATE OF CORRECTION

Patent No. 3,845,119      Dated October 29, 1974

Inventor(s) Roy B. Duke et al

It is certified that error appears in the above-identified patent and that said Letters Patent are hereby corrected as shown below:

Col. 2, line 16:      Delete "$H_2CO_3 + ROON_a \rightleftharpoons RCOON + NaHCO_3$" and insert therefor --$H_2CO_3 + ROON_a \rightleftharpoons RCOOH + NaHCO_3$--.

Signed and Sealed this

Sixth Day of September 1977

[SEAL]

Attest:

RUTH C. MASON      LUTRELLE F. PARKER
*Attesting Officer*      *Acting Commissioner of Patents and Trademarks*